Aug. 28, 1923.
R. REYNOLDS
BRAKE BAND LINING
Filed Oct. 7, 1922
1,466,189
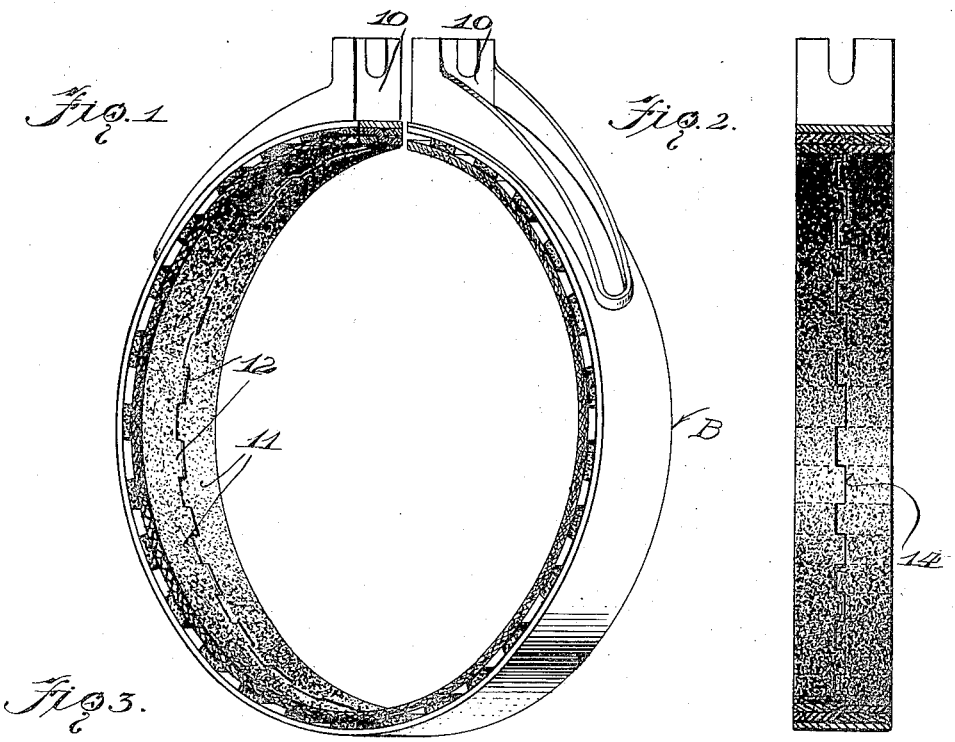
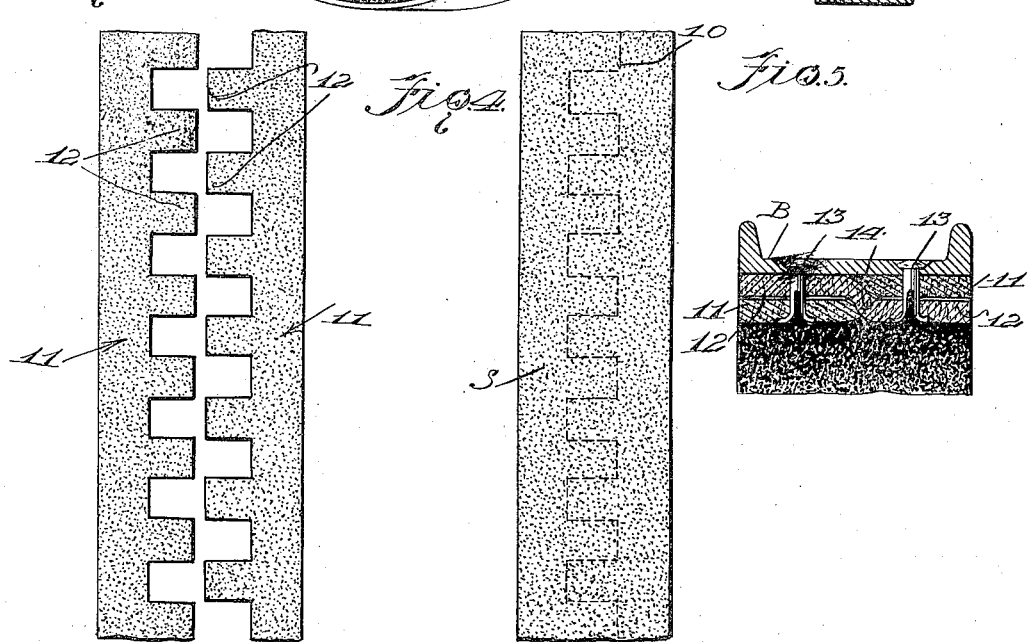
WITNESSES
M. W. Fowler
INVENTOR
Roy Reynolds
BY
ATTORNEYS Patented Aug. 28, 1923.

1,466,189

UNITED STATES PATENT OFFICE.

ROY REYNOLDS, OF CINCINNATI, OHIO.

BRAKE-BAND LINING.

Application filed October 7, 1922. Serial No. 592,997.

*To all whom it may concern:*

Be it known that I, ROY REYNOLDS, a citizen of the United States, and a resident of Cincinnati, in the county of Hamilton and State of Ohio, have invented certain new and useful Improvements in Brake-Band Linings, of which the following is a specification.

This invention relates to brake band linings.

The invention more particularly relates to the method and manufacture of an improved form of brake band linings such as employed upon motor vehicles or the like.

The object of the invention is to provide a brake band lining adapted to be associated with any standard form of brake band and serve in a highly efficient manner as a friction braking medium.

It is also an object of the invention that the brake band lining of the present invention have a relatively long "service life".

A further and important object of the invention is that the lining be adapted to be made without any loss of the friction material constituting the same.

Other objects, and objects relating to details of construction, combination and arrangement of parts will hereinafter appear in the detailed description to follow.

The invention is illustrated by way of example in the accompanying drawings, in which:—

Figure 1 is a perspective view of a brake band showing the application of the present invention.

Figure 2 is a vertical sectional view of the same.

Figure 3 is a detail plan view of a pair of brake band strips stamped or formed in accordance with the present invention.

Figure 4 is a similar view showing a strip of friction material from which the strip shown in Figure 3 may be stamped or cut.

Figure 5 is a transverse sectional view of the brake band shown in Figure 1.

Referring to the drawings more particularly, B indicates generally a brake band which is split and each of its ends carrying the usual connecting lug.

In carrying out the invention there is preferably employed vulcanized fiber, a strip of the same generally indicated by the reference character S in Figure 4. This strip is stamped or cut upon the zigzag line 10 and thus providing the two strips 11 as shown in Figure 3, and each strip having a series of teeth or projections 12 which occur in equal spaced relation, and the teeth or projections of one strip occurring in alternate relation with respect to the teeth or projections 12 of the other strip.

The strip S should conform in length to the inner circumference of the brake band B when assembling the brake band lining. In assembling the strips 11 the same are brought together and each tooth or projection 12 of one strip passed or extended between a pair of adjacent teeth or projections of the other strip as illustrated to advantage in Figures 1, 2 and 5. The projections 12 of each strip correspond substantially to one-half the width of the brake band B to which the same is to be applied. This brake band lining may now be positioned within the brake band and rivets 13 employed whereby to secure the same to the brake band. These rivets are preferably of the type usually employed in securing brake band linings, as shown in Figure 5, and each rivet extends through one of the strips 11 and a projection or tooth 12 overlapping or extending transversely thereof as also illustrated in Figure 5.

It should be here mentioned that with a brake band lining of the present invention, the middle portion 14 of the brake band lining has a certain amount of resiliency due to the manner in which the strips 11 forming the brake band lining are interlinked with each other. This resilient character of the brake band lining causes the same to grip the drum upon which the same may operate in an exceedingly high degree and thus enabling a high braking force to be applied to the drum. It has also been found that with a brake band lining of the present construction that the same will lubricate itself and thus increase its serviceable life.

It should be also stated that in making a brake band lining a strip of the material employed should correspond in length to the inner circumference of the brake band to be lined and should be (1½) times the width of the lining desired. Upon the strip of material being stamped or cut the two sections provided may be fitted together and secured to the brake band through the means of rivets or the like as previously described.

While I have shown and described a specific form of my invention it is to be understood that I am aware of the fact that changes might be made in the same relative to the general arrangement of the strips and construction thereof as indicated by the appended claims.

I claim:—

1. The method of forming a friction lining, which consists in stamping a strip of frictional material upon an irregular line to provide alternate projections upon the members or sections so formed, and then connecting the sections together by bringing the projections of each section together so that they overlap the other section.

2. The method of forming a brake band lining, which consists in stamping longitudinally a strip of material upon a zigzag line, and then linking or connecting the sections so formed together by extending the projections of one section between adjacent projections of the other section, and bringing the said sections together so that the outer portions of the original zigzag line will form the longitudinal center between said sections.

3. The method of forming a brake band lining, which consists in stamping a strip of material upon a zigzag line longitudinally thereof, and then bringing the sections so formed so that the projections provided by said stamping upon each section will overlap the other section and occur upon similar sides of said sections.

4. In combination with a brake band, a lining therefor having a resilient central portion extending circumferentially thereof.

5. A brake band lining, comprising a pair of strips, projections formed upon a longitudinal edge of each strip, and each pair of adjacent projections of one strip being adapted to receive therebetween a projection of the other strip whereby to interlock the strips together.

6. In combination, a brake band, a pair of strips arranged upon the inner circumference of said brake band, said strips having overlapping transverse extensions adapted to be employed to secure the strips together and the brake band lining upon the brake band.

7. In combination, a brake band, a pair of strips arranged upon the inner circumference of said band, said strips having overlapping projections extending transversely with respect to one another, and rivets extending through said brake band, strips and overlapping projections whereby to secure the brake band lining to the brake band.

8. In combination, a brake band, a pair of brake band lining strips arranged upon the inner circumference of said brake band, said strips having overlapping transverse projections, and the projections of each strip extending beneath the other strip, and means for securing the strips to the brake band.

9. In combination, a brake band, a pair of brake band lining strips arranged upon the inner circumference of said brake band, said strips having overlapping transverse projections, and the projections of each strip extending beneath the other strip whereby to provide a central portion of the brake band lining having resiliency whereby to provide a resilient central portion in the brake band lining.

10. In combination, a brake band, a pair of brake band lining strips arranged upon the inner circumference of said brake band, said strips having overlapping transverse projections, and the projections of each strip extending beneath the other strip, and rivets extending through each strip and the extensions of the other strip crossing thereover whereby to secure the linings to the brake band and permit a central resilient portion in the brake band lining.

11. The method of forming a friction lining which consists in stamping a strip of friction material longitudinally to provide two sections with interlocking projections upon opposing edges thereof and then bringing the sections together whereby the projections may be brought into interlocking relation.

12. A brake band lining comprising a pair of strips with interlocking projections upon opposing longitudinal edges thereof, and said projections being arranged to provide a central longitudinal resilient portion for the lining.

ROY REYNOLDS.